UNITED STATES PATENT OFFICE.

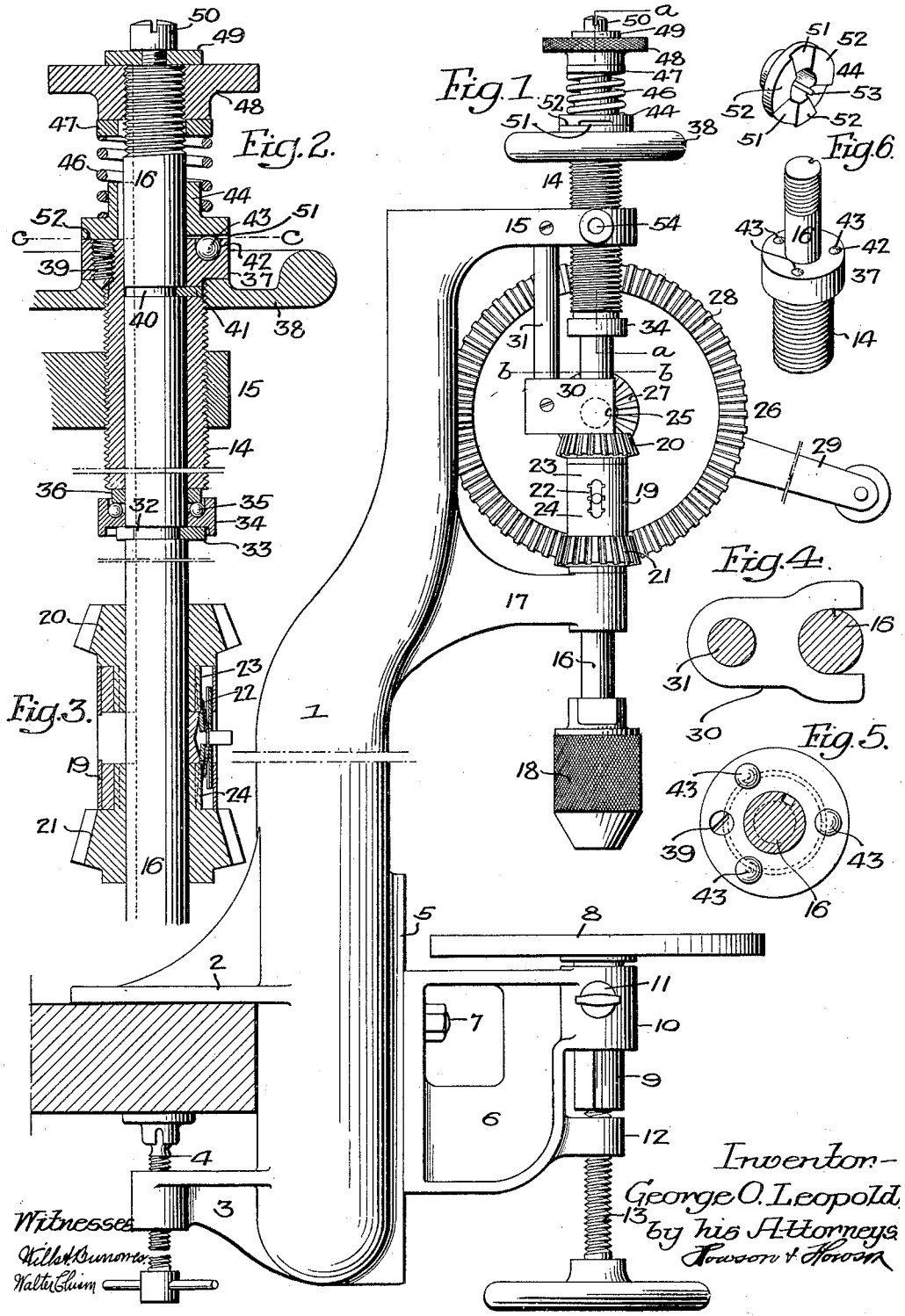

GEORGE O. LEOPOLD, OF PHILADELPHIA, PENNSYLVANIA, ASSIGNOR TO NORTH BRO'S. M'F'G. CO., OF PHILADELPHIA, PENNSYLVANIA, A CORPORATION OF PENNSYLVANIA.

BENCH-DRILL.

1,103,782.  Specification of Letters Patent.  Patented July 14, 1914.

Application filed February 17, 1913. Serial No. 748,975.

*To all whom it may concern:*

Be it known that I, GEORGE O. LEOPOLD, a citizen of the United States, residing in Philadelphia, Pennsylvania, have invented certain Improvements in Bench-Drills, of which the following is a specification.

My invention relates to certain improvements in bench drills of the type illustrated in application for patent filed by me on the 10th day of December, 1912, under Serial No. 735,982.

The object of the present invention is to provide means for automatically feeding the drill spindle to the work. This object I attain in the following manner, reference being had to the accompanying drawing, in which:—

Figure 1, is a side view of my improved bench drill; Fig. 2, is an enlarged vertical sectional view on the line *a—a*, Fig. 1; Fig. 3, is a sectional view illustrating the change speed mechanism; Fig. 4, is a sectional plan view on the line *b—b*, Fig. 1; Fig. 5, is a sectional view on the line *c—c*, Fig. 2; and Fig. 6, is a detached perspective view showing the two parts of the friction mechanism.

Referring to the drawing, 1 is the post or frame of the drill, in the present instance cylindrical in cross section and having an integral clamp plate 2 projecting at the rear thereof and a bracket 3 below the clamp plate, in which is the clamp screw 4 for clamping the drill to the bench. At the front of the post is a slideway 5 for a bracket 6 adjustably secured to the slide by a bolt 7 having a nut thereon.

8 is a table mounted on the bracket 6 and having a stem 9 which projects through a bearing 10 and has a longitudinal slot therein.

11 is a clamp screw having a point which enters the slot and is arranged to prevent the table from turning. By backing off the screw the table can be freely turned, if desired.

Mounted in a screw threaded bearing 12 is a handled adjusting screw 13 for vertically adjusting the table, and this screw can be used for feeding the work to the drill when soft material, such as wood, is being drilled.

14 is a feed screw having a threaded periphery adapted to a threaded opening in the upper bearing 15.

16 is a spindle mounted in the lower bearing 17 and extending through the feed screw 14. On the lower end of the spindle is a chuck 18, of any ordinary type, to which the drill bit is secured.

19 is a clutch sleeve which has a key extending into the spline of the spindle 16, so that the spindle will turn with the clutch sleeve. Loosely mounted on the spindle are two beveled gear wheels 20 and 21, which can be coupled to the sleeve 19 by the movement of a slide 22 which controls the pawls 23 and 24. I lay no claim to this construction, as it is shown in detail and claimed in the above mentioned application for patent.

On a horizontal shaft 25 mounted in the frame is a wheel 26 having two annular rows of teeth 27 and 28 which mesh with the beveled gear wheels 20 and 21, respectively. 29 is a handle on the said shaft 25 by which it is turned. A pulley may be mounted on this shaft instead of on the handle, if it is desired to drive the mechanism by power.

In order to hold the change gear mechanism, consisting of the sleeve and the beveled gear wheels, onto the bearing 17, I mount a forked bearing 30 on the end of a rod 31 secured to the upper bearing 15. The spindle 16 has an annular groove 32 in which is a U-shaped washer 33 on which rests the ball race 34 in which is a series of balls 35, and supported on these balls is an upper ball ring 36 against which rests the lower end of the feed screw 14, so that the spindle is forced down to its work by the feed screw through the medium of the ball bearing.

The upper end of the feed screw has a head 37 and screwed onto the upper end of said screw, directly below the head, is a hand wheel 38 which is held to the head by a set screw 39, Fig. 2. In order to attach the spindle to the feed screw independently of the ball bearing, so that the spindle can be retracted from the work as well as forced into the work, I form an annular groove 40 in the spindle. The feed screw is slotted opposite this groove and a key 41 is inserted in this slot and extends into the groove; the key being held in place by the hand wheel 38, as clearly shown in Fig. 2.

In the upper surface of the head 37, in the present instance, there are three sockets 42 for the balls 43, Fig. 6, and mounted on the spindle is a flanged collar 44 which rests upon the balls and is held thereon by the pressure of a spring 46 bearing against a washer 47 back of which is a handled nut 48 adapted to the threads on the end of the spindle 14. Above the nut is a washer 49 secured to the spindle by a screw 50 attached to the end of the spindle. By adjusting the handled nut 48 the flanged sleeve 44 can be forced with more or less pressure on the balls 42 in the head of the feed screw 14. The under side of the collar has radial slots 51 therein in which rest the balls 42 and, in order to overcome the pressure of the spring 46 to allow the feed screw to turn independently of the spindle 16, the balls must raise the collar 44 so as to ride upon the surface 52. The collar has a key 53 which is adapted to the longitudinal spline in the spindle in order that it will always turn with the spindle.

It will be seen by the above construction that the pressure of the spring 46 controls the feed of the drill spindle and as soon as the friction on the drill overcomes the pressure of the spring, the spindle will turn without turning the feed screw as the sleeve 44 will ride over the balls 43. This is particularly the case when the drill bites into the work to a depth which will stall the drill. When the friction does not overcome the pressure of the spring then the feed of the drill is regulated as the feed screw will turn the spindle.

By the above construction, the spindle can be lowered with the feed screw when adjusting the drill to the work and, when the feed screw is reversed, the spindle will be retracted with the feed screw.

As above remarked, when a soft material is being drilled, such as wood, then the table can be moved vertically by turning the adjusting screw 13 under the table, as well as allowing the feed mechanism to feed the drill to the work.

I claim:—

1. The combination in a drill, of a spindle; means for turning the spindle; a feed screw through which the spindle extends; a threaded bearing for the feed screw, the spindle having an annular groove and the feed screw being slotted opposite to the groove; a key mounted in the slot and extending into the groove; and a hand wheel having a threaded portion adapted to the threads of the feed screw and locking the key in position.

2. The combination of a spindle; means for turning the spindle; a feed screw through which the spindle extends; a bearing for the feed screw, said feed screw having a head at its upper end; a hand wheel adapted to the threaded portion of the feed screw and arranged to rest directly under the head of the said feed screw; a set screw confining the hand wheel to the feed screw, the spindle having an annular groove; the feed screw having a slot opposite the annular groove; a key mounted in the slot and extending into the groove, the hand wheel retaining the key in position; and friction mechanism mounted on the spindle and resting against the end of the feed screw, said friction mechanism being carried by the spindle.

3. The combination of a spindle having a thread at one end; a collar carried by the threaded end of the spindle; bearings for the spindle; means for driving the spindle; a feed screw mounted on the spindle; means for locking the spindle to the feed screw so that it will move longitudinally with it but will allow the spindle to turn in the feed screw; a bearing for the feed screw, said feed screw having a head at the upper end; said head having a series of sockets; a ball mounted in each socket; a flanged sleeve mounted on the projecting end of the spindle above the head of the feed screw, the underside of the flange being grooved so as to provide two surfaces on different planes; an adjusting nut on the threaded end of the spindle; a spring mounted between the adjusting nut and the sleeve so that the sleeve will yieldingly bear upon the balls in the sockets of the feed screw.

In testimony whereof, I have signed my name to this specification, in the presence of two subscribing witnesses.

GEORGE O. LEOPOLD.

Witnesses:
Wm. E. Shupe,
Wm. A. Barr.